United States Patent
Magnotta et al.

(10) Patent No.: US 11,339,260 B2
(45) Date of Patent: May 24, 2022

(54) PULTRUSION PROCESSES FOR PRODUCING FIBER REINFORCED POLYURETHANE COMPOSITIONS AND POLYURETHANE-FORMING REACTION MIXTURES SUITABLE FOR USE IN SUCH PROCESSES

(71) Applicant: Covestro LLC, Pittsburgh, PA (US)

(72) Inventors: Albert Magnotta, Monaca, PA (US); Brandon W. Parks, McKees Rocks, PA (US); Ronald A. Cageao, Beaver, PA (US)

(73) Assignee: Covestro LLC, Pittsburgh, PA (US)

( * ) Notice: Subject to any disclaimer, the term of this patent is extended or adjusted under 35 U.S.C. 154(b) by 434 days.

(21) Appl. No.: 16/528,962

(22) Filed: Aug. 1, 2019

(65) Prior Publication Data

US 2021/0032423 A1    Feb. 4, 2021

(51) Int. Cl.
| | |
|---|---|
| *C08J 5/24* | (2006.01) |
| *C08G 18/24* | (2006.01) |
| *C08G 18/48* | (2006.01) |
| *C08G 18/50* | (2006.01) |
| *C08G 18/73* | (2006.01) |
| *B29C 70/52* | (2006.01) |
| *C08G 18/32* | (2006.01) |
| *C08G 18/66* | (2006.01) |
| *C08G 18/80* | (2006.01) |
| *C08J 5/04* | (2006.01) |
| *C08G 18/08* | (2006.01) |

(52) U.S. Cl.
CPC .............. *C08J 5/24* (2013.01); *B29C 70/521* (2013.01); *C08G 18/0895* (2013.01); *C08G 18/246* (2013.01); *C08G 18/3206* (2013.01); *C08G 18/3284* (2013.01); *C08G 18/482* (2013.01); *C08G 18/4829* (2013.01); *C08G 18/4854* (2013.01); *C08G 18/5021* (2013.01); *C08G 18/6688* (2013.01); *C08G 18/73* (2013.01); *C08G 18/8016* (2013.01); *C08J 5/04* (2013.01); *C08J 5/043* (2013.01); *C08J 2375/04* (2013.01); *C08J 2375/08* (2013.01)

(58) Field of Classification Search
CPC .. B29C 70/521; C08G 18/246; C08G 18/482; C08G 18/4829; C08G 18/4854; C08G 18/5021; C08G 18/73; C08G 18/3206; C08G 18/3284; C08G 18/6688; C08G 18/8016; C08G 18/0895; C08J 5/24; C08J 5/04; C08J 5/043; C08J 2375/04; C08J 2375/08

See application file for complete search history.

(56) References Cited

U.S. PATENT DOCUMENTS

| | | | |
|---|---|---|---|
| 3,314,834 | A | 4/1967 | Walden et al. |
| 3,635,906 | A | 1/1972 | Jayawant |
| 3,956,241 | A | 5/1976 | Steele et al. |
| 5,408,001 | A | 4/1995 | Nakahata et al. |
| 5,733,945 | A | 3/1998 | Simpson |
| 6,136,876 | A | 10/2000 | Meier et al. |
| 6,908,875 | B2 | 6/2005 | Skinner et al. |
| 8,581,000 | B2 | 11/2013 | Chopra et al. |
| 8,592,517 | B2 | 11/2013 | Zander et al. |
| 9,683,125 | B2 | 6/2017 | Tye |
| 9,822,263 | B2 | 11/2017 | Sasaoka et al. |
| 9,896,571 | B2 | 2/2018 | Magnotta et al. |
| 2004/0094859 | A1 | 5/2004 | Cheolas et al. |
| 2004/0106726 | A1 | 6/2004 | Joshi et al. |
| 2006/0173128 | A1 | 8/2006 | Connolly |
| 2006/0293486 | A1 | 12/2006 | Emmrich et al. |
| 2011/0190431 | A1 | 8/2011 | Savino et al. |
| 2013/0184367 | A1 | 7/2013 | Meyer Zu Berstenhorst et al. |

FOREIGN PATENT DOCUMENTS

| | | |
|---|---|---|
| WO | 2002016482 A2 | 2/2002 |
| WO | WO 2011145446 A1 | 11/2011 |
| WO | WO 2018075302 A1 | 4/2018 |

OTHER PUBLICATIONS

Galata Chemicals Bulletin "FOMREZ® Octyl Organotin Catalysts", https://galatachemicalsfomrez.com/octyl-organotin-catalysts/, 2021.*

* cited by examiner

*Primary Examiner* — Patrick D Niland
(74) *Attorney, Agent, or Firm* — Donald R. Palladino

(57) ABSTRACT

Pultrusion processes for producing fiber reinforced polyurethane composites are described. The processes utilize a polyurethane-forming reaction mixture comprises a chelated organometallic/metalorganic catalyst. Polyurethane-forming reaction mixtures suitable for use in such processes are also described.

20 Claims, No Drawings

PULTRUSION PROCESSES FOR PRODUCING FIBER REINFORCED POLYURETHANE COMPOSITIONS AND POLYURETHANE-FORMING REACTION MIXTURES SUITABLE FOR USE IN SUCH PROCESSES

FIELD

This specification pertains generally to pultrusion processes for producing a fiber reinforced polyurethane composite that utilizes a polyurethane-forming reaction mixture that comprises a chelated organometallic/metalorganic catalyst. The specification also pertains to polyurethane-forming reaction mixtures suitable for use in such processes.

BACKGROUND

Pultrusion is a manufacturing process for producing continuous lengths of fiber reinforced plastic structural shapes. Raw materials used in pultrusion processes include a liquid resin mixture (containing resin, fillers and specialized additives) and reinforcing fibers. The process involves pulling these raw materials, rather than pushing as is the case in extrusion, through a heated steel forming die using a continuous pulling device. The reinforcement materials are in continuous forms, such as rolls of fiberglass mat or doffs of fiberglass roving. The two ways to impregnate, or "wet out", the glass are an open bath process and resin injection.

For like polyurethanes, the resin injection process has been used. In the injection process, the reinforcement materials are passed through a small closed box which is usually attached to the die or may be part of the die. The resin is injected under pressure through ports in the box to impregnate the reinforcement materials. Resin injection boxes are designed to minimize resin volume and resin residence time inside the box.

Historically, polyurethane-forming systems used to produce composites by pultrusion have generally been based upon aromatic polyisocyanates. The physical properties of these systems are very good when used in applications where the composite is used indoors and is not therefore subject to weathering. However, these aromatic polyisocyanate-based systems do not perform well in unprotected outdoor applications. Poor weathering characteristics of the resin will result in color change, gloss loss and deterioration of the resin matrix and exposure of bare glass fibers (commonly referred to as "blooming").

Aliphatic isocyanate-based polyurethane-forming systems have better weathering characteristics than the aromatic isocyanate-based systems. However, substitution of an aliphatic isocyanate for the aromatic isocyanate in pultrusion systems may produce composites with better weathering characteristics but inferior physical properties. In addition, aliphatic isocyanates are generally far less reactive than their aromatic counterparts and have typically required either more catalyst or higher temperatures to achieve comparable reactivity profiles. This results in increased material and energy consumption and costs.

While there are catalyst options that offer suitable gel times at high temperatures for aliphatic isocyanate-based polyurethane pultrusion chemistries, they typically suffer from poor pot-life in addition to issues involving bubble formation (poor catalyst selectivity) and low part quality (brittle polyurethane). As a result, production line speeds are limited, thereby hindering productivity and increasing cost.

As a result, it would be desirable to provide polyurethane pultrusion processes, including those using an aliphatic isocyanate-based polyurethane chemistry, that address curing and pot-life concerns that often plague aliphatic isocyanate-based pultrusion chemistries, thereby improving production line-speed, all while improving, or at least without detrimentally affecting, the appearance and physical properties of the resulting fiber reinforced product. It would also be desirable to provide such processes that may successfully employ reduced die temperatures, thereby reducing energy consumption and cost.

Furthermore, it would also be desirable to provide polyurethane-forming reaction mixtures suitable for use in such processes.

SUMMARY

In certain respects, the present disclosure is directed to processes for producing a fiber reinforced polyurethane composite comprising: (a) continuously pulling a roving or tow of continuous fiber reinforcing material successively through an impregnation chamber and a die; (b) continuously feeding a polyurethane-forming reaction mixture to the impregnation chamber; (c) contacting the fiber reinforcing material with the polyurethane-forming reaction mixture in the impregnation chamber such that at least partial wetting of the material by the formulation occurs; (d) directing the fiber reinforcing material through a die heated to reaction temperature to form a solid composite; and (e) drawing the composite from the die. In these processes, the polyurethane-forming reaction mixture comprises (i) a polyisocyanate, (ii) a polyol; and (iii) a catalyst composition comprising a chelated organometallic/metalorganic catalyst.

The present specification is also directed to polyurethane-forming reaction mixtures suitable for use in the foregoing processes. These reaction mixtures comprise: (a) a polyisocyanate; (b) at least 80% by weight, based on the total weight of polyols in the reaction mixture, of a polyol having a molecular weight of 150 Da to 500 Da and a functionality of at least 3; and (c) a catalyst composition comprising: (i) a chelated monoalkylmetal tricarboxylate catalyst of the formula (1) and (ii) a chelated dialkylmetal dicarboxylate catalyst of formula (2), in which formula (1) is

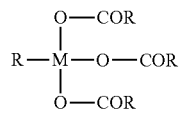

and formula (2) is

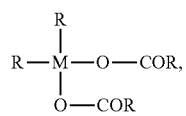

wherein M is tin (IV), and each R is independently a hydrocarbon or a substituted hydrocarbon radical, wherein the chelated monoalkylmetal tricarboxylate and the chelated dialkylmetal dicarboxylate are present in a relative ratio, by weight, of 1:5 to 5:1, and wherein the chelated catalysts comprise a ligand prepared from a β-diketone of the formula:

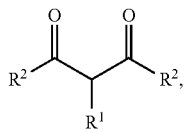

in which $R^1$ is hydrogen, an alkyl group, an aryl group, a cycloalkyl group, or a hydroxyl, nitro, or cyano derivative thereof; and each $R^2$ is independently a hydrocarbon group.

The present specification is also directed to, among other things, fiber reinforced polyurethane composites produced from the foregoing processes, as well as to polyurethanes that are the reaction product of the foregoing polyurethane-forming reaction mixtures.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of polyurethane foams, the hydroxyl groups react with isocyanate groups, —NCO, that are attached to the isocyanate compound. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1×1000)/OH number.

Equivalent weights and molecular weights given herein in Daltons (Da) are number average equivalent weights and number average molecular weights respectively, as determined, unless indicated otherwise, by gel-permeation chromatography (GPC) using a method based on DIN 55672-1, employing chloroform as the eluent with a mixed bed column (Agilent PL Gel; SDVB; 3 micron Pore diameter: 1×Mixed–E+5 micron Pore diameter: 2×Mixed–D), refractive index (RI) detection and calibrated with polyethylene glycol as the standard.

As indicated, certain implementations of the present specification relate to processes for producing a fiber reinforced polyurethane composite via pultrusion by: (a) continuously pulling a roving or tow of continuous fiber reinforcing material successively through an impregnation chamber and a die; (b) continuously feeding a polyurethane-forming reaction mixture to the impregnation chamber; (c) contacting the fiber reinforcing material with the polyurethane-forming reaction mixture in the impregnation chamber such that at least partial wetting of the material by the formulation occurs; (d) directing the fiber reinforcing material through a die heated to reaction temperature to form a solid composite; and (e) drawing the composite from the die.

In certain implementations of such a process, a polyisocyanate and an isocyanate-reactive component, such as one or more polyols, are fed to a metering machine for delivery in a desired ratio to produce a polyurethane-forming reaction mixture that is fed to an injection die where it impregnates fibers being pulled concurrently into the injection die. In some implementations, the conditions in the injection die are such that little, or, in some cases, no polymerization of the polyurethane-forming reaction mixture will occur. The resulting uncured composite is pulled through a zoned heating die, attached directly to the injection die, having a desired cross-section where it is shaped and cured. The dynamic forces needed to pull the composite through the forming die are provided by a pulling machine which has gripping devices that contact the cured composite profile (or the glass fibers therein) and give the traction necessary to pull the composite profile through the die. The machine may also have a device that develops a force in the desired direction of pull that gives the impetus necessary to pull the composite profile continuously through the die. The resulting composite profile upon exiting the pulling machine may be cut to the desired length, for example, by an abrasive cut off saw.

A long fiber based reinforcing material provides mechanical strength to the pultruded composite, and allows the transmission of the pulling force in the process. In some implementations, the fibers are at least long enough to pass though both the impregnation and curing dies and attach to a source of tension. Suitable fibrous reinforcing materials for use in the processes of this specification include any fibrous material or materials that can provide long fibers capable of being at least partially wetted by the polyurethane-forming reaction mixture during impregnation. The fibrous reinforcing structure may be single strands, braided strands, woven or non-woven mat structures, combinations of these, or the like. Mats or veils made of long fibers may be used, in single ply or multi-ply structures. Suitable fibrous materials include, but are not limited to, glass fibers, glass mats, carbon fibers, polyester fibers, natural fibers, aramid fibers, nylon fibers, basalt fibers, combinations thereof. The fibers and/or fibrous reinforcing structures may be formed continuously from one or more reels feeding into the pultrusion apparatus and attached to a source of pulling force at the outlet side of the curing die. The reinforcing fibers may optionally be pre-treated with sizing agents or adhesion promoters.

The weight percentage of the long fiber reinforcement in the pultruded composites described herein may vary, depending on the end use application intended for the composite articles. Reinforcement loadings may, for example, be from 30 to 95% by weight, from 40 to 90% by weight, from 60 to 90% by weight, or, in some cases, from 70 to 90% by weight, based on the weight of the final composite.

In some embodiments, the polyisocyanate component and the isocyanate-reactive component may be the only components that are fed into the impregnation die in the pultrusion process. The polyisocyanate component and/or the isocyanate reactive component may, however, be premixed with catalyst and any optional additives.

In certain implementations, the pultrusion apparatus has at least one impregnation die and at least one curing die. Because, in some implementations, little or no polymerization is to take place in the impregnation die, the curing die will sometimes operate at a higher temperature than the impregnation die. The pultrusion apparatus may contain a plurality of curing dies, or zones. Different curing zones may be set at different temperatures, if desired, but, in many cases, all the zones of the curing die will be higher in temperature than the impregnation die. The pultrusion apparatus may contain a plurality of impregnation dies, but in some cases, there is just one impregnation die, which is often situated immediately prior to the first curing die (or zone). As mentioned, the impregnation die is, in some implementations, set at a temperature that provides for substantially no reaction (polymerization) between the polyisocyanate component and the polyisocyanate-reactive component in the polyurethane-forming reaction mixture before the fibrous reinforcing structure, which has been at least partially impregnated with the polyurethane-forming reaction mixture, enters the first curing die (or zone).

The polyurethane-forming reaction mixtures used in the processes of this specification comprise an organic diisocyanate and/or polyisocyanate. Any of the known organic polyisocyanates, modified polyisocyanates or isocyanate-terminated prepolymers made from any of the known organic isocyanates may be used. Suitable organic polyisocyanates include aromatic, aliphatic, and cycloaliphatic polyisocyanates and combinations thereof. In some implementations, the diisocyanate and/or polyisocyanate (collectively referred to as "polyisocyanate" in this specification) have a viscosity at 25° C. of less than 1000 cps.

Examples of suitable polyisocyanates include those represented by the formula:

$$Q(NCO)_n$$

in which n is a number from 2 to 5, such as 2 to 3, and Q is an aliphatic hydrocarbon group containing 2 to 12, such as 4 to 6, carbon atoms, or a cycloaliphatic hydrocarbon group containing 4 to 6, such as 5 to 6, carbon atoms, an araliphatic hydrocarbon group containing 8 to 15, such as 8 to 13, carbon atoms, or an aromatic hydrocarbon group containing 6 to 15, such as 6 to 13, carbon atoms.

Specific examples of suitable polyisocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate); 2,4- and 2,6-hexahydrotoluene diisocyanate and mixtures thereof; dicyclohexylmethane-4,4'-diisocyanate (hydrogenated MDI, or HMDI); 1,3- and 1,4-phenylene diisocyanate; 2,4- and 2,6-toluene diisocyanate and mixtures thereof (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI); norbornane diisocyanates; m- and p-isocyanatophenyl sulfonylisocyanates; perchlorinated aryl polyisocyanates; modified polyisocyanates containing carbodiimide groups; modified polyisocyanates containing urethane groups; modified polyisocyanates containing allophanate groups; modified polyisocyanates containing isocyanurate groups; modified polyisocyanates containing urea groups; polyisocyanates containing biuret groups; polyisocyanates obtained by telomerization reactions; polyisocyanates containing ester groups; reaction products of the above-mentioned isocyanates with acetals; and polyisocyanates containing polymeric fatty acid groups. It is also possible to use the isocyanate-containing distillation residues accumulating in the production of isocyanates on a commercial scale, optionally in solution in one or more of the polyisocyanates mentioned above. Mixtures of any two or more of the above-described polyisocyanates are of course also suitable.

In certain implementations, however, it may be desirable to employ an aliphatic polyisocyanate. In some implementations, for example, an aliphatic polyisocyanate is present in an amount of at least 50% by weight, such as at least 80% by weight, at least 90% by weight, or, in some cases at least 99% by weight or 100% by weight, based on the total weight of polyisocyanate.

Specific examples of suitable aliphatic polyisocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-iso-cyanato-3,3,5-trimethyl-5-isocyanatomethylcyclohexane (isophorone diisocyanate or IPDI); and dicyclohexylmethane-4,4'-diisocyanate (hydrogenated MDI, or HMDI), as well as mixtures of any two or more thereof.

Isocyanate-terminated prepolymers may also be employed. Prepolymers may be prepared by reacting an excess of organic polyisocyanate or mixtures thereof with a minor amount of an active hydrogen-containing compound as determined by the Zerewitinoff test, as described by Kohler in "Journal of the American Chemical Society," 49, 3181(1927).

In some implementations, the polyisocyanate comprises a polyisocyanate having a number averaged isocyanate (NCO) functionality of from at least 2 to 6, such as 2 to 4 or, in some cases, 2 to 3. Moreover, in some implementations, the polyisocyanate component has a free isocyanate group content (NCO content) of 20% to 30% by weight, such as 23% to 30%, or, in some cases, 25% to 27% by weight. In some implementations, the polyisocyanate component may include a HMDI-terminated polyether prepolymer, such as those based on polypropylene ether glycol, that has a NCO content of 20% to 30% by weight, 23% to 30%, or, in some cases, 25% to 27% by weight.

In the processes of this specification, the polyurethane-forming reaction mixture also comprises a polyol and a catalyst composition comprising a chelated organometallic/metalorganic catalyst. In certain implementations, the polyol and catalyst composition are combined, in some cases with other components and additives, to form an isocyanate-reactive composition, that is then combined with the polyisocyanate to form the polyurethane-forming reaction mixture.

Suitable polyols include, but are not limited to, polyether polyols and polyester polyols. In certain implementations, the polyol comprises a polyether polyol prepared by reacting an alkylene oxide, a halogen substituted or aromatic substituted alkylene oxide, or a mixture thereof, with an active hydrogen containing initiator compound.

In certain embodiments, the polyol comprises a polyol having a number averaged functionality of organically bound primary or secondary alcohol groups of at least 1.8, such as 1.8 to 10, 1.9 to 8, or, in some cases, 2 to 6.

The isocyanate-reactive composition, in some implementations, contains predominantly, on a weight basis, a mixture of polyols. Thus, in some cases, the polyol comprises a mixture of two or more polyols.

In certain implementations, the polyol comprises one or more rigid polyols. As will be appreciated, polyols that provide structural rigidity in the derived polymer are sometimes referred to in the art as "rigid polyols". In certain implementations, the rigid polyols employed in the processes of this specification have a number averaged molecular weight of 80 Da to less than 1,500 Da, 80 to 750 Da, or, in some cases, 150 Da to 500 Da; and a number averaged isocyanate reactive group functionality of 2 to 10, or, in some cases, 2 to 6, 2 to 5, 3 to 5, or 3 to 4. Such compounds include, for example, polyether or polyester polyols containing primary and/or secondary hydroxyl groups. In certain implementations, such rigid polyol(s) are present in the polyurethane-forming reaction mixture in an amount of at least 80% by weight, such as at least 90% by weight, or, in some cases, at least 95% by weight or at least 99% by weight, based on the total weight of polyols present in the polyurethane-forming reaction mixture.

In some implementations, the rigid polyol comprises at least one amine-initiated, sometimes aliphatic amine-initiated, polyether polyol having a functionality of greater than 3, such as greater than 3 to 5, in some cases 4 to 5, or 4, and a molecular weight of 150 to 410, such as 240 Da to 300 Da.

Suitable amine-initiated polyols include, for example, the alkoxylation product of amines or aminoalcohols with at least two active hydrogen atoms with ethylene oxide and/or propylene oxide. Suitable aliphatic amine and aminoalcohol initiators include ammonia, ethylene diamine, hexamethylene diamine, methyl amine, diaminodiphenyl methane, aniline, ethanolamine, diethanolamine, N-methyl diethanolamine, tetrahydroxyl ethyl ethylenediamine, or a mixture of any two or more thereof. In some embodiments, the aliphatic amine-initiated polyol is the alkoxylation product of propylene oxide and ethylene diamine.

In some embodiments, the foregoing amine-initiated, such as aliphatic amine-initiated, polyether polyol is utilized in an amount of 10 to 50%, such as 20 to 40% or 30 to 40% by weight, based upon the total weight of isocyanate-reactive components, such as polyols, in the polyurethane-forming reaction mixture.

Other rigid polyols may be included in the polyurethane-forming reaction mixture. In certain implementations, the rigid polyol further comprises a hydroxy-initiated polyether polyol having a functionality of at least 3, such as 3 to 5, in some cases 4 to 5, or 4, and a molecular weight of 150 Da to 600 Da, 150 to 500 Da, or 150 to 410 Da. Suitable such polyether polyols include, for example alkoxylation products of hydroxy-functional starter molecules, such as ethylene glycol, propylene glycol, butanediol, hexanediol, trimethylolpropane, glycerin, pentaerythritol, sorbitol or mixtures of these and also other hydroxy-functional compounds (with the proviso that any low functionality starters, such as diols, are utilized in combination with higher functionality polyols, such as those having a hydroxyl functionality of 4 or more, in an amount such that the resulting polyether polyol has an average functionality of at least 3) with propylene oxide or butylene oxide.

In some embodiments, the foregoing hydroxyl-initiated polyether polyol, or mixture of two or more thereof, is utilized in an amount of 50% to 90% by weight, such as 60 to 80% by weight or 60 to 70% by weight, based on total weight of isocyanate-reactive components, such as polyols, in the polyurethane-forming reaction mixture. In some implementations, the hydroxyl-initiated polyether polyol comprises a hydroxy-initiated polyether polyol having a functionality of at least 3 and less than 4, and a hydroxy-initiated polyether polyol having a functionality of at least 4, such as 4 to 5. In some of these implementations, the hydroxyl-initiated polyether polyol having a functionality of at least 4 and the hydroxy-initiated polyether polyol having a functionality of at least 3 and less than 4 are present in a relative weight ratio of at least 1:1, such as at least 1.5:1 or, in some cases, at least 1.7:1.

In certain implementations, polyols referred to as chain extenders and/or crosslinkers may be included. Such polyols have molecular weights of 60 to less than 150 and isocyanate-reactive group functionalities of from 2 to 4, such as 2 to 3. However, it may be desirable to minimize the amount or avoid chain extenders and/or crosslinkers altogether.

Examples of chain-extenders/crosslinkers are simple glycols and triols, such as ethylene glycol, propylene glycol, dipropylene glycol, 1,4-butanediol, 1,3-butanediol, triethanolamine, triisopropanolamine, tripropylene glycol, diethylene glycol, triethylene glycol, as well as mixtures of any two or more thereof, as well as amines, such as diisopropanolamine, diethanolamine, 3,5-diethyl-2,4-diaminotoluene, 3,5-diethyl-2,6-diaminotoluene, and mixtures of any two or more thereof.

If desired, polyols that furnish softblock segments may be included. Such polyols often have a number average molecular weight of at least 1,500 Da, such as 1,750 Da to 8,000 Da, a number average equivalent weight of 400 Da to 4,000 Da, such as 750 Da to 2,500 Da, and a number average functionality of isocyanate-reactive organic —OH groups of 1.8 to 10, such as 2 to 4. Such compounds include, for example, aliphatic polyether or aliphatic polyester polyols containing primary and/or secondary hydroxyl groups. In some implementations, such softblock polyols are present in an amount of 1 to 20% by weight, such as 10 to 20% by weight, based on the total weight of isocyanate-reactive components in the polyurethane-forming reaction mixture.

As previously indicated, in the processes of this specification, the polyurethane-forming reaction mixture also comprises a catalyst composition. More particularly, the catalyst composition comprises a chelated organometallic/metalorganic catalyst. As used herein, the term "organometallic/metalorganic catalyst" means that the catalyst is an organometallic compound or a metalorganic compound. Thus, in the processes of this specification, by "organometallic/metalorganic catalyst", it is meant that an organometallic catalyst may be used in the absence of a metalorganic catalyst, a metalorganic catalyst may be used in the absence of an organometallic catalyst, or both an organometallic catalyst and a metalorganic catalyst may be used. As will be appreciated, an organometallic compound is a compound that contains at least one metal-carbon bond, i.e., a chemical bond directly between a metal and a carbon atom of an organic molecule. As will also be appreciated, a metalorganic compound is a metal-containing compound that lacks a direct metal-carbon bond but which contains one or more organic ligands.

In certain embodiments, the chelated organometallic/metalorganic catalyst comprises a ligand prepared from a functional molecule, such as a molecule having acid (such as carboxylic acid), amine, thiol, or hydroxyl functionality, among others. In certain implementations, however, the organometallic/metalorganic catalyst comprises a ligand prepared from a β-diketone, such as a β-diketone of the formula:

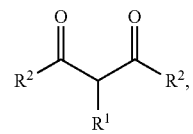

in which $R^1$ is hydrogen, an alkyl group having, for example, 1 to 10 carbon atoms, such as methyl, ethyl, propyl, isopropyl, butyl, isobutyl, t-butyl, pentyl, hexyl, cyclohexyl, heptyl, octyl, dodecanyl, octadecanyl, and the like, an aryl group, such as phenyl, cycloalkyl, or a hydroxyl, nitro, or cyano derivative thereof; and each $R^2$ is independently a hydrocarbon group, such as a saturated hydrocarbon group (such as methyl, ethyl, propyl, isopropyl, butyl, isobutyl, t-butyl, pentyl, hexyl, cyclohexyl, heptyl, octyl, dodecanyl, octadecanyl and the like), or an unsaturated hydrocarbon group (such as vinyl, an allyl, prenyl, crotyl, cyclopentadienyl, phenyl, tolyl, xylyl, a substituted aryl group and the like).

Specific examples of suitable β-diketones also include, but are not limited to, 2,4-pentanedione, 1,1,1-trifluoro-2,4-pentanedione, 1,1,1,5,5,5-hexafluoro-2,4-pentanedione, 2,4-hexanedione, 5-methyl-2,4-hexanedione, 5,5-dimethyl-2,4-hexanedione, 3-ethyl-2,4-pentanedione, 3-methyl-2,4-pentanedione, 2,4-octanedione, 2,4-decanedione, 2,2-dimethyl-3,5-nonanedione, 2,4-tridecanedione, 1-cyclohexyl-1,3-butanedione, 5,5-dimethyl-1,3-cyclohexanedione, 1,3-cyclohexanedione, 1-phenyl-1,3-butanedione, 1-phenyl-1,3-pentanedione, 1-(4-biphenyl)-1,3-butanedione, 3-benzyl-2,4-pentanedione, 1-phenyl-5,5-dimethyl-2,4-hexanedione, 1-phenyl-2-butyl-1,3-butanedione, and 1-phenyl-3,3-(2-methoxy-phenyl)-1,3-propanedione. Mixtures of any two or more thereof can, of course, also be used.

Any of a variety of organometallic/metalorganic catalysts can be used to form the chelated organometallic/metalorganic catalyst utilized in the processes of this specification. In certain embodiments, however, the organometallic/metalorganic catalyst comprises aluminum, barium, cadmium, calcium, cerium (III), chromium (III), cobalt (II), cobalt (III), copper (II), indium, iron (III), lanthanum, lead (II), manganese (II), manganese (III), neodymium, nickel (II), palladium (II), potassium, samarium, sodium, terbium, tin (II), tin (IV), titanium, vanadium, yttrium, zinc, zirconium, or a combination thereof. More particularly, in some cases, the organometallic/metalorganic catalyst comprises an organometallic/metalorganic catalyst having at least 3 ligand sites, such as cases in which the organometallic/metalorganic catalyst comprises both an organometallic catalyst having 2 ligand sites and an organometallic catalyst having 3 or more, in some cases 3, ligand sites. Even more particularly, in some implementations, the organometallic/metalorganic catalyst comprises a dialkylmetal dicarboxylate and a monoalkylmetal tricarboxylate. In such cases, the catalyst comprises: (i) a catalyst of the formula (1) and (ii) a catalyst of formula (2), in which formula (1) is

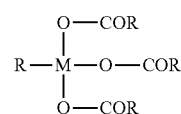

and formula (2) is

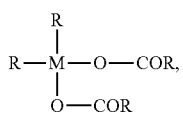

wherein M is tin (IV) and each R is independently a hydrocarbon or a substituted hydrocarbon radical, such as an alkyl, aralkyl, aryl, alkaryl, cycloalkyl, alkenyl, or cycloalkenyl radical.

Thus, in certain implementations, the organometallic/metalorganic catalyst comprises an organotin catalyst, such as an organotin(IV) catalyst. Specific examples of suitable organotin(IV) catalysts include, but are not limited to, various dialkyltin dicarboxylates, $(R)_2Sn(OCOR)_2$, and monoalkyltin tricarboxylates, $RSn(OCOR)_3$, in which each R is as described above with respect to formula (1) and formula (2). As a result, in certain embodiments, the organometallic catalyst comprises both a dialkyltin dicarboxylate and a monoalkyltin tricarboxylate. Specific examples of suitable dialkyltin dicarboxylates include, but are not limited to, dimethyltin dineodecanoate $((CH_3)_2Sn(OOCC_9H_{19})_2)$, dibutyltin diacetate $((C_4H_9)_2Sn(OOCCH_3)_2)$, dibutyltin dilaurate $((C_4H_9)_2Sn(OOCC_{11}H_{23})_2)$, dioctyltin diacetate $((C_8H_{17})_2Sn(OOCCH_3)_2)$, dioctyltin di(2-ethylhexanoate) $((C_8H_{17})_2Sn(OOCC_7H_{15})_2)$, dioctyltin dilaurate $((C_8H_{17})_2Sn(OOCC_{11}H_{23})_2)$ and dibutyltin dineodecanoate $((C_4H_9)_2Sn(OOCC_9H_{19})_2)$. Specific examples of suitable monoalkyltin tricarboxylates includes, but are not limited to, monobutyltin trisoctoate and monobutyltin tris(2-ethylhexanoate). Mixtures of any two or more thereof can, of course, also be used.

More specifically, in some implementations, the organometallic/metalorganic catalyst comprises a dialkylmetal dicarboxylate, such as a dialkyltin dicarboxylate (such as any of those mentioned above), and a monalkylmetal tricarboxylate, such as a monoalkyltin tricarboxylate (such as any of those mentioned above), in which the monoalkylmetal tricarboxylate (such as monoalkyltin tricarboxylate) and the dialkylmetal dicarboxylate (such as dialkyltin dicarboxylate) are present in a relative ratio, by weight, of 1:5 to 5:1, such as 1:3 to 3:1, 1:2 to 2:1, or, in some cases 1:1.5 to 1.5:1.

In certain embodiments, the chelating agent, such as the β-diketone mentioned earlier, is present in an amount sufficient to bind with at least 80%, such as at least 90%, or, in some cases, is present in an amount sufficient to bind with 100% of the ligand sites of the organometallic/metalorganic catalysts present. Thus, in implementations where the organometallic/metalorganic catalyst comprises a dialkylmetal dicarboxylate, such as a dialkyltin dicarboxylate (such as any of those mentioned above), and a monalkylmetal tricarboxylate, such as a monoalkyltin tricarboxylate (such as any of those mentioned above), the chelating agent, such as the β-diketone mentioned earlier, is present in an amount sufficient to bind with at least 80%, such as at least 90%, or, in some cases, is present in an amount sufficient to bind with 100% of the total ligand sites available from the monoalkylmetal tricarboxylate (such as monoalkyltin tricarboxylate) and the dialkylmetal dicarboxylate (such as dialkyltin dicarboxylate).

In fact, it was discovered, surprisingly, that several benefits can be achieved by proper selection of the chelated catalyst composition in the processes of this specification. First, it was discovered that high quality pultruded fiber-reinforced polyurethane composites could be produced at significantly increased line speeds (such as at least 50 inches per minute, at least 60 inches per minute, or, in some cases, at least 70 inches per minute), thereby dramatically improving productivity. Second, it was discovered that such a benefit could be achieved even at reduced die temperatures, thereby potentially significantly reducing energy usage and cost. Third, the resulting composites can exhibit significantly improved surface appearance, evaluated in terms of increased smoothness, reduced surface defects, and an increased glossy ("wetter") appearance. Fourth, the reaction mixture can exhibit a significantly increased open time, i.e., a significantly longer time until gelation, in the wet-out box, which means less build-up of material in the wet-out box, resulting in longer run times, as well as reducing concerns resulting from a line stoppage if other production problems are encountered. Fifth, the reaction mixtures can exhibit significantly reduced cure times, i.e., "snap" cure, that can produce tougher composites with improved physical properties (such as improved dimensional stability and higher Tg) due to a higher degree of cure in the finished part.

As a result, certain implementations of the present specification are directed to polyurethane-forming reaction mixtures. These reaction mixtures comprise: (a) a polyisocyanate; (b) at least 80% by weight, based on the total weight of polyols in the reaction mixture, of a polyol having a molecular weight of 150 Da to 500 Da and a functionality of at least 3; and (c) a catalyst composition comprising: (i) a chelated monoalkylmetal tricarboxylate catalyst of the formula (1), and (ii) a chelated dialkylmetal dicarboxylate catalyst of formula (2), in which formula (1) is

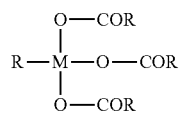

and formula (2) is

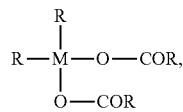

wherein M is tin (IV), and each R is independently a hydrocarbon or a substituted hydrocarbon radical, wherein the chelated monoalkylmetal tricarboxylate and the chelated dialkylmetal dicarboxylate are present in a relative ratio, by weight, of 1:5 to 5:1, and wherein the chelated catalysts comprise a ligand prepared from a β-diketone of the formula:

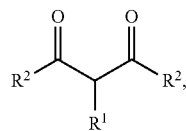

in which $R^1$ is hydrogen, an alkyl group, an aryl group, a cycloalkyl group, or a hydroxyl, nitro, or cyano derivative thereof; and each $R^2$ is independently a hydrocarbon group.

The reaction mixture may include other ingredients, such as, for example, other catalysts. For example, tertiary amine catalysts may be suitable, specific examples of which include triethylenediamine, N,N-dimethyl cyclohexylamine, bis-(dimethylamino)-diethyl ether, N-ethyl morpholine, N,N,N',N',N"-pentamethyl diethylenetriamine, N,N-dimethyl aminopropylamine, N-benzyl dimethylamine, and aliphatic tertiary amine-containing amides of carboxylic acids, such as the amides of N,N-dimethyl aminopropylamine with stearic acid, oleic acid, hydroxystearic acid, and dihydroxylstearic acid.

Examples of suitable tertiary amine acid salt catalysts include those prepared by the at least partial neutralization of formic acid, acetic acid, 2-ethyl hexanoic acid, oleic acid, or oligomerized oleic acid with a tertiary amine such as triethylenediamine, triethanolamine, triisopropanolamine, N-methyl diethanolamine, N,N-dimethyl ethanolamine, mixtures thereof.

In some implementations, however, the reaction mixture is substantially free, or, in some cases, completely free of tertiary amine catalysts and/or other catalysts besides the chelated organometallic/metalorganic catalysts described earlier. In this context, the term "substantially free" means that such catalysts if present at all, are not present in an amount sufficient to materially affect the basic and novel characteristics of the inventions described in this specification. In some implementations, such catalysts are present, if at all, in an amount of less than 10% by weight, less than 5% by weight, or, in some cases, less than 1% by weight, or less than 0.1% by weight, based on the total weight of catalysts present in the reaction mixture.

The polyurethane-forming reaction mixture may contain other optional additives, if desired. These optional additives are often included in the isocyanate-reactive composition prior to processing, although it is also possible to premix all or any part of the optional additives package with the polyisocyanate component under the proviso that it does cause the polyisocyanate to self-react or otherwise interfere with pultrusion processing of the reaction system. Examples of additional optional additives include particulate or short fiber fillers, internal mold release agents, fire retardants, smoke suppressants, dyes, pigments, antistatic agents, antioxidants, UV stabilizers, minor amounts of viscosity reducing inert diluents, combinations of these, and any other known additives from the art. In some embodiments of the present invention, the additives or portions thereof may be provided to the fibers, such as by coating the fibers with the additive.

Suitable internal mold release agents include, for example, fatty amides such as erucamide or stearamide, fatty acids such a oleic acid, oleic acid amides, fatty esters such as LOXIOL G71 S inert polyester (from Henkel), carnuba wax, beeswax (natural esters), butyl stearate, octyl stearate, ethylene glycol monostearate, ethylene glycol distearate, glycerin di-oleate, glycerin tri-oleate, and esters of polycarboxylic acids with long chain aliphatic monovalent alcohols such as dioctyl sebacate, mixtures of (a) mixed esters of aliphatic polyols, dicarboxylic acids and long-chained aliphatic monocarboxylic acids, and (b) esters of the groups: (1) esters of dicarboxylic acids and long-chained aliphatic monofunctional alcohols, (2) esters of long-chained aliphatic monofunctional alcohols and long-chained aliphatic monofunctional carboxylic acids, (3) complete or partial esters of aliphatic polyols and long-chained aliphatic monocarboxylic acids, silicones such as TEGO IMR 412T silicone (from Goldschmidt), KEMESTER 5721 ester (a fatty acid ester product from Witco Corporation), fatty acid metal carboxylates such as zinc stearate and calcium stearate, waxes such as montan wax and chlorinated waxes, fluorine containing compounds such as polytetrafluoroethylene, fatty alkyl phosphates (both acidic and non acidic types such as ZELEC UN, ZELEC AN, ZELEC MR, ZELEC VM, ZELEC UN, ZELEC LA-1, and ZELEC LA-2 phosphates, which are all commercially available from Stepan Chemical Company), chlorinated-alkyl phosphates; hydrocarbon oils, combinations of these, and the like. Exemplary suitable internal mold release agents are TECHLUBE 550HB available from Technick Products and 1948MCH available from Axel Plastics.

Suitable fillers include, for example, aluminum trihydrate, antimony oxide, milled glass fibers, wollastonite, talc, mica, flaked glass, titanium dioxide, micronized polyethylene and combinations thereof.

Other optional additives for use in pultrusion processing of polyurethanes include moisture scavengers, such as molecular sieves; defoamers, such as polydimethylsiloxanes; coupling agents, such as the mono-oxirane or organo-amine functional trialkoxysilanes; combinations of these and the like. Fine particulate fillers, such as clays and fine silicas, are often used at thixotropic additives. Such particulate fillers may also serve as extenders to reduce resin usage.

Fire retardants are sometimes desirable as additives in pultruded composites. Exemplary fire retardant types include, but are not limited to, t|riaryl|$_{[BP1]}$ phosphates; trialkyl phosphates, especially those bearing halogens; melamine (as filler); melamine resins (in minor amounts); halogenated paraffins and combinations thereof.

The stoichiometry of mixing isocyanate-based polymer forming formulations, containing an organic polyisocyanate and a polyfunctional isocyanate reactive resin is often expressed by a quantity known in the art as the isocyanate index. The index of such a mixing activated formulation is simply the ratio of the total number of reactive isocyanate (—NCO) groups present to the total number of isocyanate-reactive groups (that can react with the isocyanate under the conditions employed in the process). This quantity is often multiplied by 100 and expressed as a percent. Suitable index values for the processes described in this specification include, for example, 90 to 120%, such as 105 to 110%.

As will be appreciated, pultrusion is performed by supplying the polyisocyanate and isocyanate-reactive components to a mix/metering machine for delivery in a desired ratio to a mixing apparatus, such as a static mixer, to produce the reaction mixture. The reaction mixture is supplied to an injection die where it can be used to impregnate fibers being pulled concurrently into the injection die. The resulting uncured composite is pulled through a zoned heating die, attached directly to the injection die, having a desired cross-section where it is shaped and cured. The curing die may have, for example, two to three heated zones equipped with electrical heating coils individually controlled to maintain the desired temperatures. The entrance to the die is sometimes cooled. The temperature at the hottest zone sometimes ranges from 300° F. to 400° F., such as 320° to 350° F. Indeed, one aspect of the processes of the present disclosure is that lower die temperatures may be successfully employed if desired. The dynamic forces needed to pull the composite through the forming die are supplied by the pulling machine. This machine typically has gripping devices that contact the cured composite profile (or the glass fibers therein) and give the traction necessary to pull the composite profile through the die. The machine also has a device that develops a force in the desired direction of pull that gives the impetus necessary to pull the composite profile continuously through the die. The resulting composite upon exiting the pulling machine may be cut to the desired length, such as by an abrasive cut off saw.

Various aspects of the subject matter described herein are set out in the following numbered clauses:

Clause 1. A process for producing a fiber reinforced polyurethane composite comprising: (a) continuously pulling a roving or tow of continuous fiber reinforcing material successively through an impregnation chamber and a die; (b) continuously feeding a polyurethane-forming reaction mixture to the impregnation chamber; (c) contacting the fiber reinforcing material with the polyurethane-forming reaction mixture in the impregnation chamber such that at least partial wetting of the material by the formulation occurs; (d) directing the fiber reinforcing material through a die heated to reaction temperature to form a solid composite; and (e) drawing the composite from the die. In these processes, the polyurethane-forming reaction mixture comprises (i) a polyisocyanate, (ii) a polyol; and (iii) a catalyst composition comprising a chelated organometallic/metalorganic catalyst.

Clause 2. The process of clause 1, wherein substantially no polymerization of the polyurethane-forming reaction mixture occurs in the impregnation chamber.

Clause 3. The process of clause 1 or clause 2, wherein the fiber reinforcing material comprises glass fibers, glass mats, carbon fibers, polyester fibers, natural fibers, aramid fibers, nylon fibers, basalt fibers, or a combination thereof.

Clause 4. The process of one of clause 1 to clause 3, wherein the fiber reinforcing material is present in an amount of 30 to 95% by weight, 40 to 90% by weight, 60 to 90% by weight, or 70 to 90% by weight, based on the weight of the final composite.

Clause 5. The process of one of clause 1 to clause 4, wherein the polyurethane-forming reaction mixture comprises an aromatic polyisocyanate, an aliphatic polyisocyanate, a cycloaliphatic polyisocyanate, or a combination of two or more thereof, such as those represented by the formula:

Q(NCO)$_n$ in which n is a number from 2 to 5, such as 2 to 3, and Q is an aliphatic hydrocarbon group containing 2 to 12, such as 4 to 6, carbon atoms, or a cycloaliphatic hydrocarbon group containing 4 to 6, such as 5 to 6, carbon atoms, an araliphatic hydrocarbon group containing 8 to 15, such as 8 to 13, carbon atoms, or an aromatic hydrocarbon group containing 6 to 15, such as 6 to 13, carbon atoms.

Clause 6. The process of clause 5, wherein the polyisocyanate comprises ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate (and mixtures of these isomers); 1-isocyanato-3,3,5-trimethyl-5-isocyanatomethylcyclohexane (isophorone diisocyanate); 2,4- and 2,6-hexahydrotoluene diisocyanate (and mixtures thereof); dicyclohexylmethane-4,4'-diisocyanate (hydrogenated MDI, or HMDI); 1,3- and 1,4-phenylene diisocyanate; 2,4- and 2,6-toluene diisocyanate (and mixtures thereof) (TDI); diphenylmethane-2,4'- and/or -4,4'-diisocyanate (and mixtures thereof) (MDI); naphthylene-1,5-diisocyanate; triphenylmethane-4,4',4''-triisocyanate; polyphenyl-polymethylene-polyisocyanates of the type which may be obtained by condensing aniline with formaldehyde, followed by phosgenation (crude MDI); a norbornane diisocyanate; m- and p-isocyanatophenyl sulfonylisocyanates; a perchlorinated aryl polyisocyanate; a modified polyisocyanate containing carbodiimide groups; a modified polyisocyanate containing urethane groups; a modified polyisocyanate containing allophanate groups; a modified polyisocyanate containing isocyanurate groups; a modified polyisocyanate containing urea groups; a polyisocyanate containing biuret groups; a polyisocyanate obtained by telomerization reactions; a polyisocyanates containing ester groups; a reaction product of the above-mentioned isocyanates with acetals; polyisocyanates containing polymeric fatty acid groups; and mixtures of two or more of any of the foregoing.

Clause 7. The process of clause 5 or clause 6, wherein an aliphatic polyisocyanate is present in an amount of at least 50% by weight, such as at least 80% by weight, at least 90% by weight, or, in some cases at least 99% by weight or 100% by weight, based on the total weight of polyisocyanate.

Clause 8. The process of clause 7, wherein the aliphatic polyisocyanate comprises ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate (or a mixtures thereof); 1-isocyanato-3,3,5-trimethyl-5-isocyanatomethylcyclohexane (isophorone diisocyanate or IPDI); dicyclohexylmethane-4,4'-diisocyanate (hydrogenated MDI, or HMDI), or a mixture of any two or more thereof.

Clause 9. The process of one of clause 5 to clause 8, wherein the polyisocyanate has a number averaged isocyanate (NCO) functionality of 2 to 6, such as 2 to 4 or 2 to 3, and/or a free isocyanate group content (NCO content) of 20% to 30% by weight, such as 23% to 30%, or 25% to 27% by weight.

Clause 10. The process of one of clause 5 to clause 9, wherein the polyisocyanate comprises a HMDI-terminated polyether prepolymer, such as those based on polypropylene ether glycol, that has a free isocyanate group content (NCO content) of 20% to 30% by weight, 23% to 30%, or 25% to 27% by weight.

Clause 11. The process of one of clause 1 to clause 10, wherein the polyurethane-forming reaction mixture comprises a polyol, such as a polyether polyol, a polyester polyol, or a mixture thereof.

Clause 12. The process of clause 11, wherein the polyol comprises a rigid polyol having a number averaged molecular weight of 80 Da to less than 1,500 Da, of 80 to 750 Da, or of 150 Da to 500 Da and a number averaged isocyanate reactive group functionality of 2 to 10, 2 to 6, 2 to 5, 3 to 5 or 3 to 4, such as where the rigid polyol is present in an amount of at least 80% by weight, such as at least 90% by weight, or, in some cases, at least 95% by weight or at least 99% by weight, based on the total weight of polyols present in the polyurethane-forming reaction mixture.

Clause 13. The process of clause 12, wherein the rigid polyol comprises an amine-initiated (such as aliphatic amine-initiated), polyether polyol having a functionality of greater than 3, such as greater than 3 to 5, 4 to 5, or 4, and a molecular weight of 150 to 410 Da, such as 240 Da to 300 Da.

Clause 14. The process of clause 13, wherein the amine-initiated (such as aliphatic amine-initiated) polyether polyol is present in an amount of 10 to 50%, 20 to 40% or 30 to 40% by weight, based upon the total weight of isocyanate-reactive components, such as polyols, in the polyurethane-forming reaction mixture.

Clause 15. The process of clause 13 or clause 14, wherein the rigid polyol further comprises a hydroxy-initiated polyether polyol having a functionality of at least 3, such as 3 to 5, 4 to 5, or 4, and a molecular weight of 150 Da to 600 Da, 150 to 500 Da, or 150 to 410 Da.

Clause 16. The process of clause 15, wherein the hydroxyl-initiated polyether polyol is present in an amount of 50% to 90% by weight, 60 to 80% by weight or 60 to 70% by weight, based on total weight of isocyanate-reactive components, such as polyols, in the polyurethane-forming reaction mixture.

Clause 17. The process of clause 15 or clause 16, wherein the hydroxyl-initiated polyether polyol comprises a hydroxy-initiated polyether polyol having a functionality of at least 3 and less than 4, and a hydroxy-initiated polyether polyol having a functionality of at least 4, such as 4 to 5, such as where the hydroxyl-initiated polyether polyol having a functionality of at least 4 and the hydroxy-initiated polyether polyol having a functionality of at least 3 and less than 4 are present in a relative weight ratio of at least 1:1, such as at least 1.5:1 or at least 1.7:1.

Clause 18. The process of one of clause 1 to clause 17, wherein the chelated organometallic/metalorganic catalyst comprises a ligand prepared from a β-diketone, such as a β-diketone of the formula:

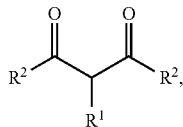

in which $R^1$ is hydrogen, an alkyl group having, for example, 1 to 10 carbon atoms, such as methyl, ethyl, propyl, isopropyl, butyl, isobutyl, t-butyl, pentyl, hexyl, cyclohexyl, heptyl, octyl, dodecanyl, octadecanyl, and the like, an aryl group, such as phenyl, cycloalkyl, or a hydroxyl, nitro, or cyano derivative thereof; and each $R^2$ is independently a hydrocarbon group, such as a saturated hydrocarbon group (such as methyl, ethyl, propyl, isopropyl, butyl, isobutyl, t-butyl, pentyl, hexyl, cyclohexyl, heptyl, octyl, dodecanyl, octadecanyl and the like), or an unsaturated hydrocarbon group (such as vinyl, an allyl, prenyl, crotyl, cyclopentadienyl, phenyl, tolyl, xylyl, a substituted aryl group and the like).

Clause 19. The process of clause 18, wherein the β-diketone comprises 2,4-pentanedione, 1,1,1-trifluoro-2,4-pentanedione, 1,1,1,5,5,5-hexafluoro-2,4-pentanedione, 2,4-hexanedione, 5-methyl-2,4-hexanedione, 5,5-dimethyl-2,4-hexanedione, 3-ethyl-2,4-pentanedione, 3-methyl-2,4-pentanedione, 2,4-octanedione, 2,4-decanedione, 2,2-dimethyl-3,5-nonanedione, 2,4-tridecanedione, 1-cyclohexyl-1,3-butanedione, 5,5-dimethyl-1,3-cyclohexanedione, 1,3-cyclohexanedione, 1-phenyl-1,3-butanedione, 1-phenyl-1,3-pentanedione, 1-(4-biphenyl)-1,3-butanedione, 3-benzyl-2,4-pentanedione, 1-phenyl-5,5-dimethyl-2,4-hexanedione, 1-phenyl-2-butyl-1,3-butanedione, 1-phenyl-3,3-(2-methoxy-phenyl)-1,3-propanedione, or a mixture of any two or more thereof.

Clause 20. The process of one of clause 1 to clause 19, wherein the organometallic/metalorganic catalyst comprises aluminum, barium, cadmium, calcium, cerium (III), chromium (III), cobalt (II), cobalt (III), copper (II), indium, iron (III), lanthanum, lead (II), manganese (II), manganese (III), neodymium, nickel (II), palladium (II), potassium, samarium, sodium, terbium, tin(II), tin (IV), titanium, vanadium, yttrium, zinc, zirconium, or a combination thereof.

Clause 21. The process of one of clause 1 to clause 20, wherein the organometallic/metalorganic catalyst comprises an organometallic/metalorganic catalyst having 2 ligand sites and an organometallic/metalorganic catalyst having 3 or more, in some cases 3, ligand sites, such as where the organometallic/metalorganic catalyst comprises a dialkylmetal dicarboxylate and a monoalkylmetal tricarboxylate.

Clause 22. The process of one of clause 1 to clause 21, wherein the organometallic/metalorganic catalyst comprises: (i) a catalyst of the formula (1) and (ii) a catalyst of formula (2), in which formula (1) is

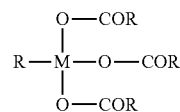

and formula (2) is

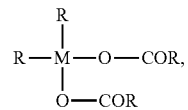

wherein each M is tin (IV), and each R is independently a hydrocarbon or a substituted hydrocarbon radical, such as an alkyl, aralkyl, aryl, alkaryl, cycloalkyl, alkenyl, or cycloalkenyl radical.

Clause 23. The process of one of clause 1 to clause 21, wherein the organometallic/metalorganic catalyst comprises an organotin catalyst, such as an organotin(IV) catalyst, such as a dialkyltin dicarboxylate, $(R)_2Sn(OCOR)_2$, and a monoalkyltin tricarboxylate, $RSn(OCOR)_3$, in which each R is as described above with respect to formula (1) and formula (2), such as where the dialkyltin dicarboxylate comprises dimethyltin dineodecanoate $((CH_3)_2Sn(OOCC_9H_{19})_2)$, dibutyltin diacetate $((C_4H_9)_2Sn(OOCCH_3)_2)$, dibutyltin dilaurate $((C_4H_9)_2Sn(OOCC_{11}H_{23})_2)$, dioctyltin diacetate $((C_8H_{17})_2Sn(OOCCH_3)_2)$, dioctyltin di(2-ethylhexanoate) $((C_8H_{17})_2Sn(OOCC_7H_{15})_2)$, dioctyltin dilaurate $((C_8H_{17})_2Sn(OOCC_{11}H_{23})_2)$, dibutyltin dineodecanoate $((C_4H_9)_2Sn(OOCC_9H_{19})_2)$, or a mixture of any two or more thereof, and the monoalkyltin tricarboxylate comprises monobutyltin trisoctoate, monobutyltin tris(2-ethylhexanoate), or a mixture of any two or more thereof.

Clause 24. The process of one of clause 20 to clause 23, wherein the organometallic/metalorganic catalyst comprises a dialkylmetal dicarboxylate, such as a dialkyltin dicarboxylate (such as any of those mentioned above), and a monalkylmetal tricarboxylate, such as a monoalkyltin tricarboxylate (such as any of those mentioned above), in which the monoalkylmetal tricarboxylate (such as monoalkyltin tricarboxylate) and the dialkylmetal dicarboxylate (such as dialkyltin dicarboxylate) are present in a relative ratio, by weight, of 1:5 to 5:1, 1:3 to 3:1, 1:2 to 2:1, or 1:1.5 to 1.5:1.

Clause 25. The process of one of clause 1 to clause 24, wherein the chelating agent, such as the β-diketone, is present in an amount sufficient to bind with at least 80%, such as at least 90%, or, in some cases, is present in an amount sufficient to bind with 100% of the ligand sites of the organometallic/metalorganic catalysts present.

Clause 26. The process of one of clause 1 to clause 25, wherein the polyurethane-forming reaction mixture further comprises a tertiary amine catalyst, such as triethylenediamine, N,N-dimethyl cyclohexylamine, bis-(dimethylamino)-diethyl ether, N-ethyl morpholine, N,N,N',N',N''-pentamethyl diethylenetriamine, N,N-dimethyl aminopropylamine, N-benzyl dimethylamine, an aliphatic tertiary amine-containing amide of a carboxylic acid, such as an amide of N,N-dimethyl aminopropylamine with stearic acid, oleic acid, hydroxystearic acid, and dihydroxylstearic acid, a tertiary amine acid salt catalyst, such as those prepared by the at least partial neutralization of formic acid, acetic acid, 2-ethyl hexanoic acid, oleic acid, or oligomerized oleic acid with a tertiary amine, such as triethylenediamine, triethanolamine, triisopropanolamine, N-methyl diethanolamine, N,N-dimethyl ethanolamine, or a mixture of any two or more thereof.

Clause 27. The process of one of clause 1 to clause 25, wherein the reaction mixture is substantially free, or, in some cases, completely free of tertiary amine catalysts and/or other catalysts besides the chelated organometallic/metalorganic catalysts described earlier, such as where such catalysts are present, if at all, in an amount of less than 10% by weight, less than 5% by weight, or, in some cases, less than 1% by weight, or less than 0.1% by weight, based on the total weight of catalysts present in the reaction mixture.

Clause 28. The process of one of clause 1 to clause 27, wherein the polyurethane-forming reaction mixture further comprises an internal mold release agent, a filler, a thixotropic agent, a fire retardant, a smoke suppressant, a dye, a pigment, an antistatic agent, an antioxidant, a UV stabilizer, an inert diluent, a moisture scavenger, a defoamer, a coupling agent, or a mixture of any two or more thereof.

Clause 29. The process of one of clause 1 to clause 28, wherein the isocyanate-forming reaction mixture has an index of 90 to 120%, such as 105 to 110%.

Clause 30. The process of one of clause 1 to clause 29, wherein a maximum die temperature of 300° F. to 400° F., such as 320° to 350° F., is employed and/or the fiber reinforcing material is continuously pulled through the impregnation chamber and the die at a line speed of at least 50 inches per minute, at least 60 inches per minute, or, in some cases, at least 70 inches per minute.

Clause 31. A polyurethane-forming reaction mixture comprising: (a) a polyisocyanate; (b) at least 80% by weight, based on the total weight of polyols in the reaction mixture, of a rigid polyol having a molecular weight of 150 Da to 500 Da and a functionality of at least 3; and (c) a catalyst composition comprising: (i) a chelated monoalkylmetal tricarboxylate catalyst of the formula (1) and (ii) a chelated dialkylmetal dicarboxylate catalyst of formula (2), in which formula (1) is

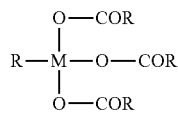

and formula (2) is

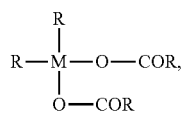

wherein M is tin (IV), and each R is independently a hydrocarbon or a substituted hydrocarbon radical, wherein the chelated monoalkylmetal tricarboxylate and the chelated dialkylmetal dicarboxylate are present in a relative ratio, by weight, of 1:5 to 5:1, and wherein the chelated catalysts comprise a ligand prepared from a β-diketone of the formula:

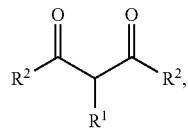

in which $R^1$ is hydrogen, an alkyl group having, for example, 1 to 10 carbon atoms, such as methyl, ethyl, propyl, isopropyl, butyl, isobutyl, t-butyl, pentyl, hexyl, cyclohexyl, heptyl, octyl, dodecanyl, octadecanyl, and the like, an aryl group, such as phenyl, cycloalkyl, or a hydroxyl, nitro, or cyano derivative thereof; and each $R^2$ is independently a hydrocarbon group, such as a saturated hydrocarbon group (such as methyl, ethyl, propyl, isopropyl, butyl, isobutyl, t-butyl, pentyl, hexyl, cyclohexyl, heptyl, octyl, dodecanyl, octadecanyl and the like), or an unsaturated hydrocarbon group (such as vinyl, an allyl, prenyl, crotyl, cyclopentadienyl, phenyl, tolyl, xylyl, a substituted aryl group and the like).

Clause 32. The polyurethane-forming reaction mixture of clause 31, wherein the polyisocyanate comprises an aromatic polyisocyanate, an aliphatic polyisocyanate, a cycloaliphatic polyisocyanate, or a combination of two or more thereof, such as those represented by the formula:

Q(NCO)n in which n is a number from 2 to 5, such as 2 to 3, and Q is an aliphatic hydrocarbon group containing 2 to 12, such as 4 to 6, carbon atoms, or a cycloaliphatic hydrocarbon group containing 4 to 6, such as 5 to 6, carbon atoms, an araliphatic hydrocarbon group containing 8 to 15, such as 8 to 13, carbon atoms, or an aromatic hydrocarbon group containing 6 to 15, such as 6 to 13, carbon atoms.

Clause 33. The polyurethane-forming reaction mixture of clause 31 or clause 32, wherein the polyisocyanate comprises ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate (and mixtures of these isomers); 1-isocyanato-3,3,5-trimethyl-5-isocyanatomethylcyclohexane (isophorone diisocyanate); 2,4- and 2,6-hexahydrotoluene diisocyanate (and mixtures thereof); dicyclohexylmethane-4,4'-diisocyanate (hydrogenated MDI, or HMDI); 1,3- and 1,4-phenylene diisocyanate; 2,4- and 2,6-toluene diisocyanate (and mixtures thereof) (TDI); diphenylmethane-2,4'- and/or -4,4'-diisocyanate (and mixtures thereof) (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI); a norbornane diisocyanate; m- and p-isocyanatophenyl sulfonylisocyanates; a perchlorinated aryl polyisocyanate; a modified polyisocyanate containing carbodiimide groups; a modified polyisocyanate containing urethane groups; a modified polyisocyanate containing allophanate groups; a modified polyisocyanate containing isocyanurate groups; a modified polyisocyanate containing urea groups; a polyisocyanate containing biuret groups; a polyisocyanate obtained by telomerization reactions; a polyisocyanates containing ester groups; a reaction product of the above-mentioned isocyanates with acetals; polyisocyanates containing polymeric fatty acid groups; and mixtures of two or more of any of the foregoing.

Clause 34. The polyurethane-forming reaction mixture of one of clause 31 to clause 33, wherein an aliphatic polyisocyanate is present in an amount of at least 50% by weight, such as at least 80% by weight, at least 90% by weight, or, in some cases at least 99% by weight or 100% by weight, based on the total weight of polyisocyanate.

Clause 35. The polyurethane-forming reaction mixture of clause 34, wherein the aliphatic polyisocyanate comprises ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate (or a mixtures thereof); 1-isocyanato-3,3,5-trimethyl-5-isocyanatomethylcyclohexane (isophorone diisocyanate or IPDI); dicyclohexylmethane-4,4'-diisocyanate (hydrogenated MDI, or HMDI), or a mixture of any two or more thereof.

Clause 36. The polyurethane-forming reaction mixture of one of clause process of one of clause 31 to clause 35, wherein the polyisocyanate has a number averaged isocyanate (NCO) functionality of 2 to 6, such as 2 to 4 or 2 to 3, and/or a free isocyanate group content (NCO content) of 20% to 30% by weight, such as 23% to 30%, or 25% to 27% by weight.

Clause 37. The polyurethane-forming reaction mixture of one of clause 31 to clause 36, wherein the polyisocyanate comprises a HMDI-terminated polyether prepolymer, such as those based on polypropylene ether glycol, that has a free isocyanate group content (NCO content) of 20% to 30% by weight, 23% to 30%, or 25% to 27% by weight.

Clause 38. The polyurethane-forming reaction mixture of one of clause 31 to clause 37, wherein the rigid polyol is present in an amount of at least 90% by weight, or, in some cases, at least 95% by weight or at least 99% by weight, based on the total weight of polyols present in the polyurethane-forming reaction mixture.

Clause 39. The polyurethane-forming reaction mixture of one of clause 31 to clause 38, wherein the rigid polyol comprises an amine-initiated (such as aliphatic amine-initiated), polyether polyol having a functionality of greater than 3, such as greater than 3 to 5, 4 to 5, or 4, and a molecular weight of 150 to 410 Da, such as 240 Da to 300 Da, such as where the amine-initiated (such as aliphatic amine-initiated) polyether polyol is present in an amount of 10 to 50%, 20 to 40% or 30 to 40% by weight, based upon the total weight of isocyanate-reactive components, such as polyols, in the polyurethane-forming reaction mixture.

Clause 40. The polyurethane-forming reaction mixture of one of clause 31 to clause 39, wherein the rigid polyol further comprises a hydroxy-initiated polyether polyol having a functionality of at least 3, such as 3 to 5, 4 to 5, or 4, and a molecular weight of 150 Da to 600 Da, 150 to 500 Da, or 150 to 410 Da, such as where the hydroxyl-initiated polyether polyol is present in an amount of 50% to 90% by weight, 60 to 80% by weight or 60 to 70% by weight, based on total weight of isocyanate-reactive components, such as polyols, in the polyurethane-forming reaction mixture.

Clause 41. The polyurethane-forming reaction mixture of clause 40, wherein the hydroxyl-initiated polyether polyol comprises a hydroxy-initiated polyether polyol having a functionality of at least 3 and less than 4, and a hydroxy-initiated polyether polyol having a functionality of at least 4, such as 4 to 5, such as where the hydroxyl-initiated polyether polyol having a functionality of at least 4 and the hydroxy-initiated polyether polyol having a functionality of at least 3 and less than 4 are present in a relative weight ratio of at least 1:1, such as at least 1.5:1 or at least 1.7:1.

Clause 42. The polyurethane-forming reaction mixture of one of clause 31 to clause 41, wherein the β-diketone comprises 2,4-pentanedione, 1,1,1-trifluoro-2,4-pentanedione, 1,1,1,5,5,5-hexafluoro-2,4-pentanedione, 2,4-hexanedione, 5-methyl-2,4-hexanedione, 5,5-dimethyl-2,4-hexanedione, 3-ethyl-2,4-pentanedione, 3-methyl-2,4-pentanedione, 2,4-octanedione, 2,4-decanedione, 2,2-dimethyl-3,5-nonanedione, 2,4-tridecanedione, 1-cyclohexyl-1,3-butanedione, 5,5-dimethyl-1,3-cyclohexanedione, 1,3-cyclohexanedione, 1-phenyl-1,3-butanedione, 1-phenyl-1,3-pentanedione, 1-(4-biphenyl)-1,3-butanedione, 3-benzyl-2,4-pentanedione, 1-phenyl-5,5-dimethyl-2,4-hexanedione, 1-phenyl-2-butyl-1,3-butanedione, 1-phenyl-3,3-(2-methoxy-phenyl)-1,3-propanedione, or a mixture of any two or more thereof.

Clause 43. The polyurethane-forming reaction mixture of one of clause 31 to clause 42, wherein the dialkyltin dicarboxylate comprises dimethyltin dineodecanoate (($CH_3$)$_2$Sn(OOCC$_9$H$_{19}$)$_2$), dibutyltin diacetate (($C_4H_9$)$_2$Sn(OOCCH$_3$)$_2$), dibutyltin dilaurate (($C_4H_9$)$_2$Sn(OOCC$_{11}$H$_{23}$)$_2$), dioctyltin diacetate (($C_8H_{17}$)$_2$Sn(OOCCH$_3$)$_2$), dioctyltin di(2-ethylhexanoate) (($C_8H_{17}$)$_2$Sn(OOCC$_7$H$_{15}$)$_2$), dioctyltin dilaurate (($C_8H_{17}$)$_2$Sn(OOCC$_{11}$H$_{23}$)$_2$), dibutyltin dineodecanoate (($C_4H_9$)$_2$Sn(OOCC$_9$H$_{19}$)$_2$), or a mixture of any two or more thereof, and the monoalkyltin tricarboxylate comprises monobutyltin trisoctoate, monobutyltin tris(2-ethylhexanoate), or a mixture of any two or more thereof.

Clause 44. The polyurethane-forming reaction mixture of one of clause 31 to clause 43, wherein the monoalkylmetal tricarboxylate (such as monoalkyltin tricarboxylate) and the dialkylmetal dicarboxylate (such as dialkyltin dicarboxylate) are present in a relative ratio, by weight, of 1:3 to 3:1, 1:2 to 2:1, or 1:1.5 to 1.5:1.

Clause 45. The polyurethane-forming reaction mixture of one of clause 31 to clause 44, wherein the β-diketone is present in an amount sufficient to bind with at least 80%, such as at least 90%, or, in some cases, is present in an amount sufficient to bind with 100% of the ligand sites of the catalysts present.

Clause 46. The polyurethane-forming reaction mixture of one of clause 31 to clause 45, further comprising a tertiary amine catalyst, such as triethylenediamine, N,N-dimethyl cyclohexylamine, bis-(dimethylamino)-diethyl ether, N-ethyl morpholine, N,N,N',N',N"-pentamethyl diethylenetriamine, N,N-dimethyl aminopropylamine, N-benzyl dimethylamine, an aliphatic tertiary amine-containing amide of a carboxylic acid, such as an amide of N,N-dimethyl aminopropylamine with stearic acid, oleic acid, hydroxystearic acid, and dihydroxylstearic acid, a tertiary amine acid salt catalyst, such as those prepared by the at least partial neutralization of formic acid, acetic acid, 2-ethyl hexanoic acid, oleic acid, or oligomerized oleic acid with a tertiary amine, such as triethylenediamine, triethanolamine, triisopropanolamine, N-methyl diethanolamine, N,N-dimethyl ethanolamine, or a mixture of any two or more thereof.

Clause 47. The polyurethane-forming reaction mixture of one of clause 31 to clause 45, wherein the reaction mixture is substantially free, or, in some cases, completely free of tertiary amine catalysts and/or other catalysts besides the chelated organometallic/metalorganic catalysts described earlier, such as where such catalysts are present, if at all, in an amount of less than 10% by weight, less than 5% by weight, or, in some cases, less than 1% by weight, or less than 0.1% by weight, based on the total weight of catalysts present in the reaction mixture.

Clause 48. The polyurethane-forming reaction mixture of one of clause 31 to clause 47, further comprising an internal mold release agent, a filler, a thixotropic agent, a fire retardant, a smoke suppressant, a dye, a pigment, an antistatic agent, an antioxidant, a UV stabilizer, an inert diluent, a moisture scavenger, a defoamer, a coupling agent, or a mixture of any two or more thereof.

Clause 49. The polyurethane-forming reaction mixture of one of clause 31 to clause 48, wherein the isocyanate-forming reaction mixture has an index of 90 to 120%, such as 105 to 110%.

The non-limiting and non-exhaustive examples that follow are intended to further describe various non-limiting and non-exhaustive implementations without restricting the scope of the implementations described in this specification.

EXAMPLES

The following components were used in the Examples set forth in the table below. Amounts listed are in parts by weight.

POLYOL A: A polypropylene oxide-based triol having a molecular weight of 160 which is commercially available from Covestro LLC under the name MULTRANOL® 9133.

POLYOL B: A tetra-functional amine-based polyether polyol having a molecular weight of 290 which is commercially available from Covestro.

POLYOL C: A pentaerythritol-based polyether polyol having a molecular weight of 408 which is commercially available from BASF under the name Pluracol® PEP 450.

LIGHT STABILIZER: Commercially available from BASF under the name TINUVIN® B75.

IMR: Commercially available from Axel Plastics as AXEL INT 1960 MCH.

UV STABILIZER: Commercially available from Chromaflo Technologies Corp. as SYNERMIX™ 77-90495

KA 451: A dispersion of a Zeolith powder in a polyol produced by Covestro LLC called BAYLITH BLEND KA 451.

CATALYST 1: 1,8-diazabicycloundec-7-ene which is commercially available under the name Dabco DBU.

CATALYST 2: N,N benzyldimethylamine based catalyst commercially available from Lanxess Deutschland GmbH.

CATALYST 3: A tin carboxylate catalyst which is commercially available under the name of Fomrez® UL-38 from Momentive.

CATALYST 4: A monobutyltin carboxylate catalyst available from Reaxis Inc. as REAXIS® C220.

CATALYST 5: An organotin catalyst mixture of dibutyltin dilaurate and acetylacetone, with an amount of acetylacetone sufficient to bind with 100% of the ligand sites of the dibutyltin dilaurate and the monobutyltin carboxylate of CATALYST 4.

ISOCYANATE: An HDI based polyfunctional aliphatic polyisocyanate having an NCO content of 26% which is commercially available from Covestro LLC under the name of BAYTEC WP 260.

A nominal 5"×0.125" rectangular profile with 80% uni-directional E-glass by weight (155 ends of type 30 113 yield roving) was pultruded in the Examples presented below. The pultruded articles described in the Examples below were produced at a commercial pultruder using commercial pultrusion equipment with a resin injection chamber in front of a 36" long die. The front of the die was water cooled, and three zones of platen heat were used to cure the composite. The pultruded product was produced at a variety of pull speeds to determine an optimal speed and also an ultimate production rate. Processing data including line speed, pull force, and die temperatures were recorded during the experimentation process. When changing from one formulation to the next dry fiber was pulled through the die to ensure no cross-contamination occurred between the Examples. Results are set forth in the Table below.

| | Example | |
|---|---|---|
| Component | 1 (comparative) | 2 |
| POLYOL A | 19.3 | 18.3 |
| POLYOL B | 27.6 | 26.2 |
| POLYOL C | 36.8 | 34.9 |
| KA 451 | 3.7 | 3.5 |
| IMR | 4.6 | 4.4 |
| LIGHT STABILIZER | 2.8 | 2.6 |
| UV STABILIZER | 2.8 | 2.6 |
| CATALYST 1 | 0.60 | — |
| CATALYST 2 | 0.95 | — |
| CATALYST 3 | 0.85 | — |
| CATALYST 4 | — | 4.7 |
| CATALYST 5 | — | 2.8 |
| ISOCYANATE | 100 | 100 |
| Mix Ratio: Iso/Poly (pbw) | 195/100 | 185/100 |
| Viscosity @ 75° F. Polyol only | 5800 cps | 1800 cps |
| Viscosity @ 75° F. Polyol + Iso | 1200 cps | 750 cps |
| Cure time @ 325° F. | 240 sec. | 120 sec |
| Gel time @75° F. | 17 min. | 1.5 hr. |
| Die temperature profile (° F.) | 325 - 400 - 375 | 325 - 350 - 335 |
| Ultimate pull speed (in./min.) | 36 | 72 |
| Material cure zone (inches from die exit) | 14-16 | 20-22 |
| Cure zone change with pull speed | Variable | None |
| Pull force (lbs.) | 2000 | 1300 |
| Surface appearance[1] | + | ++ |

[1] "+" means that the product had a nice surface with minimal defects. "++" means that the product had a noticeably nicer looking surface, relative to "+", that was smoother, had less defects, and a "wetter" appearance.

As is apparent, Example 2 was processed at double the pull speed of Example 1 and at lower die temperatures than Example 1 and produced a product with superior surface appearance than Example 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a fiber reinforced polyurethane composite comprising:
   (a) continuously pulling a roving or tow of continuous fiber reinforcing material successively through an impregnation chamber and a die;
   (b) continuously feeding a polyurethane-forming reaction mixture to the impregnation chamber;
   (c) contacting the fiber reinforcing material with the polyurethane-forming reaction mixture in the impregnation chamber such that at least partial wetting of the material by the reaction mixture occurs;
   (d) directing the fiber reinforcing material through a die heated to reaction temperature to form a solid composite; and
   (e) drawing the composite from the die,
   wherein the polyurethane-forming reaction mixture comprises:
      (i) a polyisocyanate,
      (ii) a polyol; and
      (iii) a catalyst composition comprising:
         (A) a chelated dialkyl organometallic catalyst having 2 ligand sites; and
         (B) a chelated monoalkyl organometallic catalyst having 3 or more ligand sites.

2. The process of claim 1, wherein the polyisocyanate comprises an aliphatic polyisocyanate present in an amount of at least 50% by weight, based on the total weight of polyisocyanate.

3. The process of claim 1, wherein the polyol comprises a rigid polyol having a number averaged molecular weight of 150 Da to 500 Da and number averaged isocyanate reactive group functionality of 3 to 4.

4. The process of claim 3, wherein the rigid polyol is present in an amount of at least 80% by weight, based on the total weight of polyol present in the polyurethane-forming reaction mixture.

5. The process of claim 3, wherein the rigid polyol is present in an amount of at least 90% by weight, based on the total weight of polyol present in the polyurethane-forming reaction mixture.

6. The process of claim 3, wherein the rigid polyol comprises an amine-initiated polyether polyol having a functionality of greater than 3 and a molecular weight of 150 to 410 Da.

7. The process of claim 6, wherein the amine-initiated polyether polyol is present in an amount of 10 to 50% by weight, based on the total weight of polyol in the polyurethane-forming reaction mixture.

8. The process of claim 7, wherein the rigid polyol further comprises a hydroxy-initiated polyether polyol having a functionality of at least 3 and a molecular weight of 150 Da to 600 Da that is present in an amount of 50% to 90% by weight, based on total weight of polyol in the polyurethane-forming reaction mixture.

9. The process of claim 8, wherein the hydroxyl-initiated polyether polyol comprises a hydroxy-initiated polyether polyol having a functionality of at least 3 and less than 4, and a hydroxy-initiated polyether polyol having a functionality of at least 4 where the hydroxyl-initiated polyether polyol having a functionality of at least 4 and the hydroxy-initiated polyether polyol having a functionality of at least 3 and less than 4 are present in a relative weight ratio of at least 1:1.

10. The process of claim 1, wherein the chelated dialkyl organometallic catalyst having 2 ligand sites and the chelated monoalkyl organometallic catalyst having 3 or more ligand sites both comprise a ligand prepared from a (β-diketone of the formula:

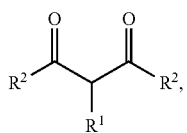

in which $R^1$ is hydrogen, an alkyl group, an aryl group, a cycloalkyl group, or a hydroxyl, nitro, or cyano derivative thereof; and each $R^2$ is independently a hydrocarbon group.

11. The process of one of claim 1, wherein the chelated dialkyl organometallic catalyst having 2 ligand sites and the chelated monoalkyl organometallic catalyst having 3 or more ligand sites both.

12. The process of claim 1, wherein the chelated dialkyl organometallic catalyst having 2 ligand sites comprises a dialkylmetal dicarboxylate and the chelated monoalkyl organometallic catalyst having 3 or more ligand sites comprises a monoalkylmetal tricarboxylate.

13. The process of claim 12, wherein the monoalkylmetal tricarboxylate comprises a catalyst of the formula (1) and the dialkylmetal dicarboxylate comprises a catalyst of formula (2), in which formula (1) is

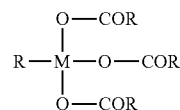

and formula

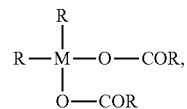

(2) is, wherein M is tin (IV), and each R is independently a hydrocarbon or a substituted hydrocarbon radical.

14. The process of claim 13, wherein the catalyst of the formula (1) comprises monobutyltin trisoctoate and the catalyst of the formula (2) comprises at least one of dioctyltin 2-ethylhexanoate and dibutyltin dilaurate.

15. The process of claim 13, wherein the catalyst of formula (1) and the catalyst of formula (2) are present in a relative ratio, by weight, of 1:5 to 5:1.

16. The process of claim 1, wherein the fiber reinforcing material is continuously pulled through the impregnation chamber and the die at a line speed of at least 50 inches per minute.

17. A polyurethane-forming reaction mixture comprising:
(a) a polyisocyanate;
(b) at least 80% by weight, based on the total weight of polyols in the reaction mixture, of a rigid polyol having a molecular weight of 150 Da to 500 Da and a functionality of at least 3; and
(c) a catalyst composition comprising:
   (i) a chelated monoalkylmetal tricarboxylate of the formula (1), and
   (ii) a chelated dialkylmetal dicarboxylate of the formula (2), wherein formula (1) is

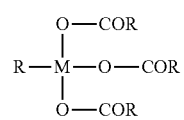

and formula (2) is

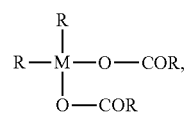

wherein M is tin (IV), and each R is independently a hydrocarbon or a substituted hydrocarbon radical,
   wherein the chelated monoalkylmetal tricarboxylate and the chelated dialkylmetal dicarboxylate are present in a relative ratio, by weight, of 1:5 to 5:1, and
   wherein the chelated organometallic catalysts comprise a ligand prepared from a β-diketone of the formula:

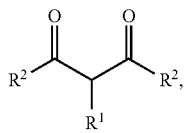

in which $R^1$ is hydrogen, an alkyl group, an aryl group, a cycloalkyl group, or a hydroxyl, nitro, or cyano derivative thereof; and each $R^2$ is independently a hydrocarbon group.

18. The polyurethane-forming reaction mixture of claim 17, wherein the rigid polyol comprises:
   (i) an amine-initiated polyether polyol having a functionality of greater than 3 and a molecular weight of 150 to 410 Da, that is present in an amount of 10 to 50%, based upon the total weight of polyols in the polyurethane-forming reaction mixture; and
   (ii) a hydroxy-initiated polyether polyol having a functionality of at least 3 and a molecular weight of 150 Da to 600 Da that is present in an amount of 50% to 90% by weight, based on total weight of polyols in the polyurethane-forming reaction mixture.

19. The polyurethane-forming reaction mixture of claim 17, wherein the chelated dialkylmetal dicarboxylate and the chelated monoalkylmetal tricarboxylate are present in a relative ratio, by weight, of 1:2 to 2:1.

20. The polyurethane-forming reaction mixture of claim 17, wherein the polyisocyanate comprises an aliphatic polyisocyanate present in an amount of at least 50% by weight, based on the total weight of polyisocyanate.

* * * * *

UNITED STATES PATENT AND TRADEMARK OFFICE
CERTIFICATE OF CORRECTION

PATENT NO. : 11,339,260 B2
APPLICATION NO. : 16/528962
DATED : May 24, 2022
INVENTOR(S) : Albert Magnotta et al.

It is certified that error appears in the above-identified patent and that said Letters Patent is hereby corrected as shown below:

In the Claims

In Column 25, Line 55, delete the text "one of" immediately before the text "claim 1".

In Column 25, Line 58, add the text "comprise tin(IV)" at the end of the sentence immediately before the ".".

Signed and Sealed this
Twenty-first Day of February, 2023

Katherine Kelly Vidal
*Director of the United States Patent and Trademark Office*